United States Patent Office 3,532,586
Patented Oct. 6, 1970

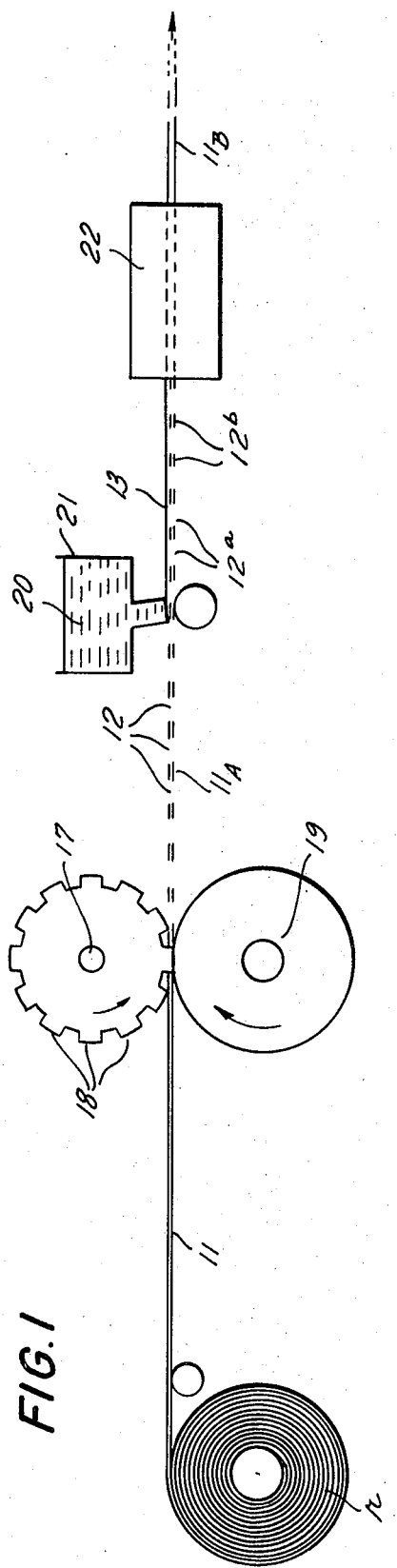
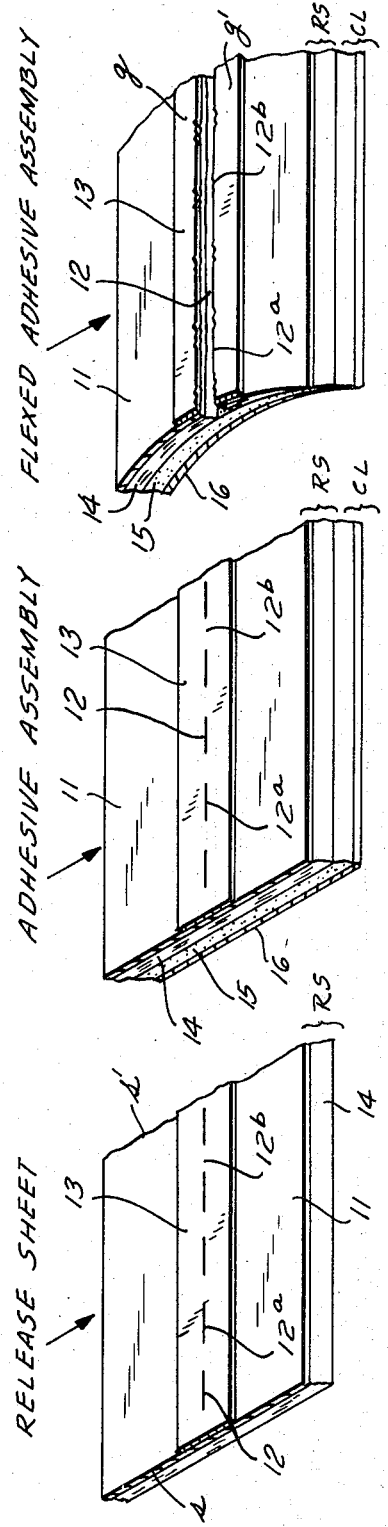

3,532,586
WATER REPELLANT PERFORATED ADHESIVE ASSEMBLY WITH RELEASE SHEET, ARTICLE AND METHOD
Donald I. Haurey, Millington, and Irwin J. Davis, Plainfield, N.J., assignors, by mesne assignments, to Compac Corporation, New York, N.Y., a corporation of Delaware (in % Laird Industries Inc.)
Filed Apr. 19, 1967, Ser. No. 631,949
Int. Cl. B32b 3/10, 33/00
U.S. Cl. 161—113                          10 Claims

ABSTRACT OF THE DISCLOSURE

An adhesive assembly comprising a pressure sensitive adhesive film coated substrate to which is adhered a release sheet provided with a rupturable line of perforations. The reverse face of said release sheet which is in face-to-face contact with the adhesive film is coated with a film of a high release material, and the obverse face of said release sheet is coated on the perforated area with a water repellent film. The adhesive assemblies are readily utilized as tapes, labels, stickers, etc.

---

The adhesive surfaces of pressure sensitive adhesive coated substrates are commonly protected by having adhered thereto a release sheet which typically comprises a base coated on the adhesive contacting surface thereof with a film of a high release material, i.e. a material having a low coefficient of friction, such as a silicone compound. Such release sheets must remain in intimate face-to-face contact with the adhesive surface of the pressure sensitive adhesive coated substrates during the manufacture, printing and storage of the adhesive product and yet must be capable of being readily stripped or removed therefrom to expose the adhesive surface at the time the adhesive coated substrate is to be used.

Many difficulties have arisen in meeting these stated requirements. Although various approaches have been suggested in order to facilitate the stripping or removal of the release sheet, none has provided all of the desired characteristics to an optimum degree. Thus, where a continuous slit has been introduced into the release sheet thereby producing a splitted release sheet, the lack of gripping edges at the slit with which to grasp and thereby remove the release sheet has proved troublesome. Where gripping edges have been provided by dint of the omission of an application of adhesive to the areas of the substrate under the split or because one section of the split release sheet has been allowed to overlap the other, variations in the printing impressions on the upper or exposed surface of the adhesive coated substrate were noted between gummed and ungummed areas as well as between overlapped and non-overlapped sections thereof. In addition, where sheets containing continuous splits have been utilized, the linear release sheet sections tend to shift or slide with the result that the edges of the linear sections overlap at one split while simultaneously forming a gap at an adjacent split. These irregularities result in printing difficulties, as previously described, as well as in the exposure of the tacky adhesive surface, the latter thereby permitting such adhesive products to adhere to one another during storage, or permitting the undesirable escape of the adhesive through the opening provided by the slit.

In order to overcome these difficulties, release sheets containing partial splits, and release sheets containing embrittled zones have also been resorted to. Partial splits have proved awkward in practice as a result of the fragmentation and tearing of the release sheet upon its attempted removal from the adhesive coated substrate; the tearing of the release sheet thereby resulting in a plurality of fragments which must be individually removed from the adhesive coated substrate. With respect to release sheets having embrittled zones, it is necessary, in their preparation, to utilize techniques which partially degrade or decompose a portion of the release sheet. The latter techniques are, moreover, difficult to control and often result in the formation of non-uniform, discolored products.

An additional difficulty which has been inherent in certain prior art adhesive assemblies results from the exposure of such assemblies to the moisture encountered in ordinary usage and/or to the varying humidity and temperature conditions encountered in storage. Thus, the moisture which is gradually absorbed by such release sheets tends to flexibilize the slitted parts or splits present thereon, thereby preventing such splits from readily rupturing upon the flexing of the release sheet.

It is the prime object of this invention to provide an adhesive assembly containing a release sheet which provides the necessary protection for the adhesive surface while nonetheless permitting its easy stripping or removal therefrom. It is also an object of the present invention to provide a release sheet in the adhesive assembly in which the rupturable area is sealed and is so maintained until the release sheet is stripped, thereby inhibiting the exposure of the tacky adhesive surface. It is a further object to provide a release sheet for said assembly which is protected from the flexibilization resulting from exposure to moisture and thus is able to retain its ability to be readily ruptured and removed from a pressure sensitive adhesive coated substrate. Various other objects and advantages of this invention will be apparent from the discussion that follows hereinafter.

We have now found that the stated deficiencies inherent in the prior art adhesive assemblies may be overcome by utilizing a release sheet which contains a series of perforations comprising a line of alternating cut and uncut sections between any two points on the outer perimeter thereof, the area of said perforations being coated with a film of a water repellent material. The presence of this unique combination in the release sheets of our invention enables the perforation line to be normally sealed and to permit of instantaneous rupture upon a flexing of the release sheet and, thereupon, to enable such sheet to be readily removed or stripped from a pressure sensitive adhesive coated substrate without tearing or fragmentation.

The invention is more specifically defined in the appended claims read together with the following descriptions and accompanying drawings thereof, in which:

FIG. 1 is a schematic view illustrating a method and apparatus for perforating a sheet base for the formation of a release sheet and then coating the resulting perforation line or the perforation area thereof with a film of a water repellent material;

FIG. 2 is a cross-sectional, perspective view shown on an enlarged scale of a part, such as a label section, of a typical release sheet obtained by employing the sheet base of FIG. 1;

FIG. 3 is a cross-sectional, perspective view drawn to the scale of FIG. 2 of an adhesive assembly of the present invention employing the release sheet of FIG. 2; and FIG. 4 is a cross-sectional, perspective view of the adhesive assembly of FIG. 3 and depicting the rupturing of the perforation line in the release sheet in the act of stripping or removing the release sheet from the adhesive substrate.

Referring, now, more in detail to the drawing, FIG. 1 illustrates a particular apparatus which may be utilized in preparing release sheets applicable for use in the novel adhesive assemblies of this invention. The paper or other base 11 of the release sheet fed from a supply reel $r$, is perforated by means of a circular blade 17 which rotates about a stationary axis and makes contact with a rotating steel roll 19. The rotary blade 17 is provided with a series of cutting teeth 18 formed preferably at regularly spaced intervals along its cutting edge which serve to impart the desired series of perforations 12 comprising a plurality of alternating cut and uncut sections $12^a$ and $12^b$ respectively to the paper base 11. The thus perforated paper base section $11_A$ is then passed under a dispenser 21 which applies a film 13 of a solution of a water repellent material 20 so as to coat the perforation line or the perforated area. The resulting coated paper base section $11_B$ is then moved through an oven 22 in order to evaporate the solvents and thereby dry the film 13 derived from the water repellent material. The thus obtained treated base 11 may then be wound on a take-up reel (not shown).

The opposite side or reverse face of the treated paper base 11 of FIG. 1 is then coated with a film of a high release material 14, the release sheet RS depicted in FIG. 2 being thereby obtained. This release sheet RS thus comprises a sheet base 11 which contains or is provided with at least one line or series of perforations 12 extending between two points on the side edges $s$, $s'$ or any two points on the outer perimeter thereof, over the area of which perforation line, on the obverse face of the base, is coated a film of a water repellent material 13, the opposite or reverse face of the base 11 being coated with a high release material 14, i.e. a material having a low coefficient of friction. It may be noted that although FIG. 2 depicts the water repellent film 13 as covering only the actual area of the perforation line 12, the protected area may be increased to include any, or all, of the remaining portion of the obverse face of the sheet base 11.

At this point, the preparation of the novel adhesive assembly of the invention is completed by laminating a pressure sensitive adhesive coated substrate CL to the release sheet RS depicted in FIG. 2. Thus, as shown in FIG. 3, a pressure sensitive adhesive coated substrate CL, comprising a solid backing 16 with a pressure sensitive adhesive film 15 adhered thereto is placed with the surface of the adhesive film 15 in intimate face-to-face contact with the surface of the high release material 14 of the release sheet RS. The resulting adhesive assembly provides a structure which enables the pressure sensitive adhesive film 15 to be completely protected during the manufacture, printing and storage of the assembly while permitting it to be readily exposed in the manner hereinafter described when it is desired to adhere the pressure sensitive adhesive coated substrate CL to the surface of another substrate.

As previously noted, it is essential that the practitioner be able to remove the protective release sheet RS in a simple and efficient manner. FIG. 4 illustrates the manner by which the novel adhesive assembly of this invention fulfills these objectives. Thus, by flexing the assembly, the perforation line or area 12 is quickly and uniformly split thereby providing gripping edges $g$, $g'$ with which the release sheet RS may be rapidly removed in complete, unfragmented sections. The water repellent film 13 coating the perforation 12 effectively seals the line of perforations and prevents the paper fibers of the uncut sections of the perforations 12 as well as those of the area immediately adjacent to the perforations 12 from absorbing moisture from the atmosphere, thereby insuring its quick and complete rupture. This complete, instantaneous rupture of the perforation line 12 is to be contrasted to the "hinge" effect, i.e. a flexible, non-rupturing lateral motion, which is exhibited by uncoated perforations upon their being exposed to atmospheric moisture.

As for the applicable pressure sensitive adhesive coated substrates 16 which may be utilized in preparing the novel adhesive assembly of this invention, they may comprise a solid backing consisting of a cellulosic or polymeric film material including, for example, paper, rubber saturated paper, polyethylene glycol terephthalate, cellophane and cloth, etc. which is coated with a pressure sensitive adhesive which may be derived from such elastomeric materials as: natural rubber; synthetic rubbers such as styrene-butadiene copolymers, polyisobutylene, butadiene-acrylonitrile copolymers, polychloroprene and polyisoprene; elastomeric copolymers containing at least about 50%, by weight, of a $C_4$–$C_{12}$ alkyl acrylate ester together with a hardening comonomer such as vinyl acetate, styrene, methyl methacrylate, ethyl methacrylate and vinyl chloride; and, elastomeric polymers of alkyl vinyl ethers such as polymethyl vinyl ether and polyethyl vinyl ether.

Representative types of paper bases 11 that may be coated with a high release material 14 and utilized as release sheets include 40 and 80 pound kraft, parchment paper and glassine of clay coated kraft, etc. Among the high release materials 14 which may be utilized to coat the paper base are included organopolysiloxane compounds, vinyl stearate-maleic anhydride copolymers and vinyl stearate-vinyl acetate copolymers, etc. It is to be noted, however, that release sheets comprising paper coated with a high release type silicone, i.e. an organopolysiloxane, compound are preferably used as the basic release sheets in the novel adhesive assemblies of this invention.

As previously noted, the essential elements of the adhesive assemblies of this invention are the perforations in the release sheet as well as the films of water repellent material which coat the perforations or the areas incident thereto. The perforations which are utilized must be discontinuous, i.e. they must be perforations which have alternating cut and uncut sections. Such perforations prevent the formation of overlapped or gapped splits and all the disadvantages inherent therein. Although perforations having a straight, i.e. linear, configuration are preferred for purposes of this invention, perforations having a circular or curved line or configuration may also be effectively utilized. With regard to the length of the respective sections of the perforation, it is desired that the ratio of the length of each respective cut section to that of each respective uncut section range from about 1.5:1 to 5:1. The determinative factor in selecting a functional ratio is the type of paper being used as the base for the release sheet. Thus, for example, typical lengths for the cut and uncut sections of clay coated kraft paper might be 4.0 mm. and 1.0 mm., respectively. Furthermore, there may be more than one series of perforated lines upon any of the adhesive assemblies of this invention. Nonetheless, the presence of one series of perforated lines in any individual adhesive assembly is ordinarily sufficient in order to achieve the desired ease and simplicity in removing the release sheet.

With regard to the water repellent material 20 which is utilized to coat the perforation line or the perforation area with a film 13, a preferred group of compounds suitable for this purpose are water repellent organo-metallic compounds which are often referred to as Werner-type complexes or coordination compounds. The latter comprise compounds to which atoms or substituent groups have been added beyond the number possible as determined on the basis of conventional electrovalent or covalent linkages. Applicable organo-metallic compounds include: stearato-chromic chloride, partially polymerized stearato-chromic chloride, myristo-chromic chloride, myristo-aluminum chloride, and certain fluorocarbon-chromium complexes, etc. These water repellents are usually applied in solutions containing from about 1 to 30%, by weight, of the organo-metallic compound; applicable solvents including isopropanol, methanol, ethanol and, less preferably, water. In order to dry and set the water repellent film, the coated release sheet is subjected to a temperature in the oven 22 ranging from about 180 to 275° F. for a period of from 15 to 90 seconds.

As previously noted, FIG. 1 depicts an apparatus which may be used for the preparation of the coated, perforated release sheets. The illustartion of the latter system is not meant, however, to preclude the use of other types of mechanical systems which may, of course, perform the same functions in a different manner. Thus, for example, a movably mounted rotary blade which is positioned at a 90° angle with respect to the movement of the release paper may be substituted for the stationarily mounted blade presently depicted, the movably mounted blade thereby being able to perforate the release paper at regularly spaced intervals along its width. Furthermore, although the high release material is preferably coated onto the release paper subsequent to the perforation and water repellent coating steps, it is also possible to reverse this sequence and still obtain functional release sheets.

By way of specific illustration of the preparation of a typical adhesive assembly of this invention, a release sheet was initially prepared by means of the system depicted in FIG. 1. Thus, clay coated kraft paper having a basis weight of 78 lbs./ream was passed under the rotary blade in order to impart a linear perforation area 12 thereto which consisted of alternating 4.0 mm. cut sections and 1.0 mm. uncut sections. An area ⅛″ wide along each side of the resulting linear perforation was then saturated with a 15%, by weight, isopropanol solution of stearato-chromic chloride whereupon the coated, perforated sheet was placed in an oven at a temperature of 225° F. in order to dry and set the resulting 0.2 mil thick film 13 of the water repellent material. The reverse surface of the release sheet which had not been coated with the water repellent was then coated with an organopolysiloxane compound 14 in a coating weight of 1.0 lb./ream, i.e. 1.0 lb./3000 square feet of coated paper. The silicone treated surface of the resulting release sheet RS was then placed in intimate face-to-face contact with the adhesive coated surface 15 of a pressure sensitive adhesive coated substrate 16 which comprised a 4 mil thick film of polyvinyl chloride having a 1 mil dry coating of a pressure sensitive adhesive based on a 50:50 octyl acrylate:vinyl acetate copolymer.

In the resulting adhesive assembly there is no overlapping sections of the release sheet of exposure of the adhesive film. Upon flexing the adhesive assembly, an immediate rupture of the perforation line is obtained thereby revealing readily accessible gripping edges which are used to efficiently remove the entire release sheet.

Furthermore, upon aging a similar adhesive assembly at room temperature for a period of 2 months, the resulting aged sample is still found to be devoid of any overlapped sections or exposed adhesive areas while the perforations may still be readily ruptured so as to permit the easy and efficient removal of the release sheet.

Summarizing, this invention is thus seen to provide a novel adhesive assembly which contains, as an integral feature thereof, a release sheet which may be readily and efficiently stripped or removed in order to expose the adhesive coated surface thereof.

Inasmuch as the present invention is susceptible of considerable modification, variations may be made in procedures and materials without departing from the scope thereof as defined by the following claims.

We claim:

1. An adhesive assembly comprising: (1) a pressure sensitive adhesive coated substrate which comprises a solid backing coated with a pressure sensitive adhesive film on one surface thereof, and (2) a release sheet adhered thereto comprising a paper base coated on its reverse side with a high release material, which latter is in intimate face-to-face contact with the adhesive film on the adhesive coated substrate, said release sheet being characterized by being provided (a) with a series of perforations in its paper base comprising alternating cut and uncut sections extending between two points on the outer perimeter thereof and (b) with a film of a water repellent compound on the obverse side of and sealing said paper base essentially covering only the area of said series of perforations.

2. The adhesive assembly of claim 1, wherein the ratio of the length of the cut and uncut sections in said series of perforations is in the range of from about 1.5:1 to 5:1.

3. The adhesive assembly of claim 1, in which said water repellent compound is an organo-metallic compound.

4. The adhesive assembly of claim 1, wherein said water repellent organo-metallic compound is stearato-chromic chloride.

5. The adhesive assembly of claim 1, wherein said high release material is an organopolysiloxane compound.

6. A method for the preparation of an adhesive assembly comprising: (1) perforating a paper base so as to impart to said base a series of perforations comprising alternating cut and uncut sections extending between two points on the outer perimeter of said paper base; (2) applying a film of a solution of a water repellent compound essentially covering only the area of said perforations sealing the same on the obverse side of said paper base; (3) drying the resulting film of said compound obtained in step (2) so as to remove the solvent therefrom; (4) coating the surface of said paper base on the reverse side thereof with a film of a high release material; and, (5) adhering the release sheet thus obtained to a pressure sensitive adhesive coated substrate comprising a solid backing coated with a pressure sensitive adhesive film, by bringing the release coated surface of the release sheet and the pressure sensitive adhesive film of the adhesively coated substrate in intimate face-to-face contact with each other.

7. The method of claim 6, wherein the ratio of the lengths of the cut and uncut sections in said series of perforations is in the range of from about 1.5:1 to 5:1.

8. The method of claim 6 wherein the said water repellent compound is an organo-metallic compound.

9. The method of claim 6, wherein said water repellent organo-metallic compound is stearato-chromic chloride.

10. The method of claim 6, wherein said high release material is an organopolysiloxane compound.

References Cited
UNITED STATES PATENTS

| | | | |
|---|---|---|---|
| 3,138,505 | 6/1964 | Hirsch | 156—289 |
| 2,273,040 | 2/1942 | Iler | 117—100 |
| 2,308,900 | 1/1943 | Tryon et al. | 161—406 XR |
| 3,031,359 | 4/1962 | Blank et al. | 161—406 XR |
| 2,985,554 | 5/1961 | Dickard | 161—209 |

JOHN T. GOOLKASIAN, Primary Examiner

W. E. HOAG, Assistant Examiner

U.S. Cl. X.R.

156—252, 289; 161—164, 406